United States Patent
Kawasaki

(10) Patent No.: US 12,037,428 B2
(45) Date of Patent: Jul. 16, 2024

(54) FLUORORUBBER COMPOSITION AND MOLDED ARTICLE

(71) Applicant: DAIKIN INDUSTRIES, LTD., Osaka (JP)

(72) Inventor: Kazuyoshi Kawasaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 582 days.

(21) Appl. No.: 17/289,872

(22) PCT Filed: Nov. 1, 2019

(86) PCT No.: PCT/JP2019/043005
§ 371 (c)(1),
(2) Date: Apr. 29, 2021

(87) PCT Pub. No.: WO2020/091034
PCT Pub. Date: May 7, 2020

(65) Prior Publication Data
US 2021/0403622 A1 Dec. 30, 2021

(30) Foreign Application Priority Data

Nov. 2, 2018 (JP) ................................. 2018-207260

(51) Int. Cl.
| | | |
|---|---|---|
| *C08L 27/16* | (2006.01) | |
| *C08F 214/22* | (2006.01) | |
| *C08K 13/02* | (2006.01) | |
| *F16L 11/06* | (2006.01) | |
| *C08K 3/26* | (2006.01) | |
| *C08K 3/32* | (2006.01) | |
| *C08K 5/50* | (2006.01) | |

(52) U.S. Cl.
CPC ............ *C08F 214/22* (2013.01); *C08K 13/02* (2013.01); *F16L 11/06* (2013.01); *C08F 2800/10* (2013.01); *C08F 2810/20* (2013.01); *C08K 2003/267* (2013.01); *C08K 2003/326* (2013.01); *C08K 5/50* (2013.01)

(58) Field of Classification Search
CPC .... C08F 214/08; C08F 214/18; C08K 5/0025; C08K 3/32; C08K 3/26; C08L 27/16
See application file for complete search history.

(56) References Cited

U.S. PATENT DOCUMENTS

| | | |
|---|---|---|
| 2003/0187144 A1 | 10/2003 | Staccione et al. |
| 2009/0082526 A1 | 3/2009 | Higashira et al. |
| 2009/0263603 A1 | 10/2009 | Ota et al. |

FOREIGN PATENT DOCUMENTS

| | | |
|---|---|---|
| CN | 101018822 A | 8/2007 |
| CN | 101448895 A | 6/2009 |
| JP | 59-023577 B2 | 6/1984 |
| JP | 2006-316120 A | 11/2006 |
| JP | 2010-150563 A | 7/2010 |

OTHER PUBLICATIONS

Extended European Search Report dated Jul. 28, 2022 in Application No. 19879293.9.
International Search Report for PCT/JP2019/043005 dated Jan. 28, 2020 (PCT/ISA/210).
International Preliminary Report on Patentability with the translation of Written Opinion dated Apr. 27, 2021 from the International Bureau in International Application No. PCT/JP2019/043005.

*Primary Examiner* — Mark S Kaucher
(74) *Attorney, Agent, or Firm* — Sughrue Mion, PLLC

(57) ABSTRACT

A fluoroelastomer composition containing (a) a polyol-crosslinkable fluoroelastomer, (b) a cross-linking agent for polyol crosslinking, (c) a crosslinking accelerator; and (d) at least one acid acceptor selected from basic magnesium carbonate and magnesium phosphate, wherein the content of a divalent metal oxide is lower than 1 part by mass with respect to 100 parts by mass of the fluoroelastomer (a). Also disclosed is a molded article obtained by crosslinking the fluoroelastomer composition.

10 Claims, No Drawings

FLUORORUBBER COMPOSITION AND MOLDED ARTICLE

CROSS REFERENCE TO RELATED APPLICATIONS

This application is a National Stage of International Application No. PCT/JP2019/043005 filed Nov. 1, 2019, claiming priority based on Japanese Patent Application No. 2018-207260 filed Nov. 2, 2018.

TECHNICAL FIELD

The present disclosure relates to a fluoroelastomer composition and a molded article.

BACKGROUND ART

Fluoroelastomers are used usually after crosslinking, and it is known that in order to crosslink a fluoroelastomer, the fluoroelastomer is compounded with a cross-linking agent, a crosslinking accelerator, an acid acceptor and the like. For example, Patent Document 1 proposes a polyol-crosslinkable fluoroelastomer composition containing 100 parts by weight of a polyol-crosslinkable fluoroelastomer, 0.5 to 10 parts by weight of a perfluoroalkane represented by the general formula $F(CF_2)_{2n}F$ (wherein n is an integer of 5 to 30), a 1H-perfluoroalkane represented by the general formula $F(CF_2)_m H$ (wherein m is an integer of 10 to 30) or a mixture thereof, 0.5 to 2 parts by weight of basic magnesium aluminum hydroxycarbonate hydrate, and 1 to 5 parts by weight of an acid acceptor excluding a Ca compound.

RELATED ART

Patent Documents

Patent Document 1: Japanese Patent Laid-Open No. 2006-316120

SUMMARY OF THE INVENTION

Problem to be Solved by the Invention

Although molded articles obtained by crosslinking fluoroelastomers are generally considered to be excellent in chemical resistance, it has been revealed by studies by the present inventor that there is room for improvement in durability to organic acids and carboxylate ester compounds.

The present disclosure, in consideration of the above finding, has an object to provide a fluoroelastomer composition capable of providing a molded article excellent in resistance to organic acids and resistance to carboxylate ester compounds.

Means for Solving the Problem

According to the present disclosure, there is provided a fluoroelastomer composition comprising (a) a polyol-crosslinkable fluoroelastomer, (b) a cross-linking agent for polyol crosslinking, (c) a crosslinking accelerator, and (d) at least one acid acceptor selected from the group consisting of a basic magnesium carbonate and a magnesium phosphate, wherein a content of a divalent metal oxide is less than 1 part by mass with respect to 100 parts by mass of the fluoroelastomer (a).

It is preferable that the fluoroelastomer composition of the present disclosure comprises 0.5 to 15 parts by mass of the cross-linking agent for polyol crosslinking (b) with respect to 100 parts by mass of the fluoroelastomer (a).

It is preferable that the fluoroelastomer composition of the present disclosure comprises 0.05 to 5 parts by mass of the crosslinking accelerator (c) with respect to 100 parts by mass of the fluoroelastomer (a).

It is preferable that the fluoroelastomer composition of the present disclosure comprises 2 to 40 parts by mass of the acid acceptor (d) with respect to 100 parts by mass of the fluoroelastomer (a).

In the fluoroelastomer composition of the present disclosure, it is preferable that the fluoroelastomer (a) comprises a vinylidene fluoride unit.

In the fluoroelastomer composition of the present disclosure, it is preferable that the magnesium phosphate is trimagnesium phosphate octahydrate.

In the fluoroelastomer composition of the present disclosure, it is preferable that a molded article obtained by crosslinking the fluoroelastomer composition has a hardness (a value after 3 sec) of 65 or higher as measured by a type-A durometer according to JIS K6253-3.

It is preferable that the fluoroelastomer composition of the present disclosure is a fluoroelastomer composition for a hose.

Further according to the present disclosure, there is provided a molded article obtained by crosslinking the above fluoroelastomer composition.

It is preferable that the molded article of the present disclosure is a hose contacting with a fluid comprising one of or both of an organic acid and a carboxylate ester compound.

It is preferable that the molded article of the present disclosure is a member for a biodiesel fuel or a member for an air management system of an internal-combustion engine.

Effects of Invention

According to the present disclosure, there can be provided a fluoroelastomer composition capable of providing a molded article excellent in resistance to organic acids and resistance to carboxylate ester compounds.

DESCRIPTION OF EMBODIMENTS

Hereinafter, specific embodiments of the present disclosure will be described in detail, but the present disclosure is not any more limited to the following embodiments.

The fluoroelastomer composition of the present disclosure comprises (a) a polyol-crosslinkable fluoroelastomer, (b) a cross-linking agent for polyol crosslinking, (c) a crosslinking accelerator and (d) an acid acceptor.

(a) Polyol-Crosslinkable Fluoroelastomer

A polyol-crosslinkable fluoroelastomer to be used in the present disclosure is suitable as long as it is a fluoroelastomer having a polyol-crosslinkable site. The polyol-crosslinkable site includes a site having a vinylidene fluoride (VdF) unit. Among fluoroelastomers, a fluoroelastomer comprising a VdF unit is preferable because of being capable of providing molded articles with higher resistance to organic acids and resistance to carboxylate ester compounds.

The fluoroelastomer having a polyol-crosslinkable site includes non-perfluoro fluoroelastomer.

The fluoroelastomer having a polyol-crosslinkable site includes VdF-based fluoroelastomer, tetrafluoroethylene (TFE)/propylene-based fluoroelastomer, TFE/propylene/VdF-based fluoroelastomer, ethylene/hexafluoropropylene (HFP)-based fluoroelastomer, ethylene/HFP/VdF-based fluoroelastomer, ethylene/HFP/TFE-based fluoroelastomer, fluorosilicone-based fluoroelastomer and fluorophosphazene-based fluoroelastomer; and these can be used singly or in any combination thereof in the range of not impairing effects of the present disclosure.

The VdF-based fluoroelastomer is preferably one represented by the following general formula (1).

$$-(M^1)-(M^2)-(N^1)- \quad (1)$$

wherein the structural unit $M^1$ is a structural unit originated from vinylidene fluoride ($m^1$); the structural unit $M^2$ is a structural unit originated from a fluorine-containing ethylenic monomer ($m^2$); and the structural unit $N^1$ is a repeating unit originated from a monomer ($n^1$) copolymerizable with the monomer ($m^1$) and the monomer ($m^2$).

Among the VdF-based fluoroelastomer represented by the general formula (1), preferable is one containing 30 to 85% by mol of the structural unit $M^1$ and 55 to 15% by mol of the structural unit $M^2$, and more preferable is one containing 50 to 80% by mol of the structural unit $M^1$ and 50 to 20% by mol of the structural unit $M^2$. The structural unit $N^1$ is preferably 0 to 20% by mol with respect to the total amount of the structural unit $M^1$ and the structural unit $M^2$.

As the fluorine-containing ethylenic monomer ($m^2$), one or two or more kinds of the monomers can be utilized; and examples thereof include TFE, chlorotrifluoroethylene (CTFE), trifluoroethylene, HFP, trifluoropropylene, tetrafluoropropylene, pentafluoropropylene, trifluorobutene, tetrafluoroisobutene, perfluoro(alkyl vinyl ether) (PAVE), fluorine-containing monomers represented by the general formula (2):

$$CF_2=CFO(Rf^1O)_q(Rf^2O)_rRf^3 \quad (2)$$

wherein $Rf^1$ and $Rf^2$ are each independently a linear or branched perfluoroalkylene group having 1 to 6 carbon atoms; $Rf^3$ is a linear or branched perfluoroalkyl group having 1 to 6 carbon atoms; and q and r are each independently an integer of 0 to 6 (provided $0<q+r\leq6$), fluorine-containing monomers represented by the general formula (3):

$$CHX^{11}=CX^{12}Rf^4 \quad (3)$$

wherein one of $X^{11}$ and $X^{12}$ is H and the other thereof is F; and $Rf^4$ is a linear or branched fluoroalkyl group having 1 to 12 carbon atoms, and fluorine-containing monomers such as vinyl fluoride; but among these, TFE, HFP and PAVE are preferable.

The monomer ($n^1$) may be any one as long as being copolymerizable with the monomer ($m^1$) and the monomer ($m^2$), but examples thereof include ethylene, propylene, alkyl vinyl ethers, monomers providing a crosslinking site, and bisolefin compounds. These can be used singly or in any combination.

Such a monomer providing a crosslinking site includes iodine- or bromine-containing monomers represented by the general formula (4):

$$CY^1_2=CY^1-Rf^5CHR^1X^1 \quad (4)$$

wherein $Y^1$ is independently a hydrogen atom, a fluorine atom or —$CH_3$; $Rf^5$ is a fluoroalkylene group, a perfluoroalkylene group, a fluoropolyoxyalkylene group or a perfluoropolyoxyalkylene group; $R^1$ is a hydrogen atom or —$CH_3$; and $X^1$ is an iodine atom or a bromine atom, and monomers represented by the general formula (5):

$$CF_2=CFO(CF_2CF(CF_3)O)_m(CF_2)_n-X^2 \quad (5)$$

wherein m is an integer of 0 to 5, and n is an integer of 1 to 3; and $X^2$ is a cyano group, a carboxyl group, an alkoxycarbonyl group, a bromine atom or an iodine atom, and monomers represented by the general formula (6):

$$CH_2=CH(CF_2)_pI \quad (6)$$

wherein p is an integer of 1 to 10, and examples thereof include iodine-containing monomers such as perfluoro(6,6-dihydro-6-iodo-3-oxa-1-hexene) and perfluoro(5-iodo-3-oxa-1-pentene) as described in Japanese Patent Publication No. 05-63482 and Japanese Patent Laid-Open No. 07-316234, iodine-containing monomers such as $CF_2=CFOCF_2CF_2CH_2I$ as described in Japanese Patent Laid-Open No. 04-217936, iodine-containing monomers such as 4-iodo-3,3,4,4-tetrafluoro-1-butene as described in Japanese Patent Laid-Open No. 61-55138, a bromine-containing monomer as described in Japanese Patent Laid-Open No. 04-505341, cyano group-containing monomers, carboxyl group-containing monomers and alkoxycarbonyl group-containing monomers as described in Japanese Patent Laid-Open No. 04-505345 and Japanese Patent Laid-Open No. 05-500070. These can be used singly or in any combination.

As the bisolefin compounds, those as described in Japanese Patent Laid-Open No. 08-12726 can be used.

The above VdF fluoroelastomer preferably specifically includes VdF/HFP-based elastomer, VdF/HFP/TFE-based elastomer, VdF/TFE/PAVE-based fluoroelastomer, VdF/CTFE-based elastomer, and VdF/CTFE/TFE-based elastomer.

The TFE/propylene-based fluoroelastomer is preferably one represented by the following general formula (7).

$$-(M^3)-(M^4)-(N^2)- \quad (7)$$

wherein the structural unit $M^3$ is a structural unit originated from TFE ($m^3$); the structural unit $M^4$ is a structural unit originated from propylene ($m^4$); and the structural unit $N^2$ is a repeating unit originated from a monomer ($n^2$) copolymerizable with the monomer ($m^3$) and the monomer ($m^4$).

Among the TFE/propylene-based fluoroelastomer represented by the general formula (7), preferable is one containing 40 to 70% by mol of the structural unit $M^3$ and 60 to 30% by mol of the structural unit $M^4$, and more preferable is one containing 50 to 60% by mol of the structural unit $M^3$ and 50 to 40% by mol of the structural unit $M^4$. The structural unit $N^2$ is preferably 0 to 40% by mol with respect to the total amount of the structural unit $M^3$ and the structural unit $M^4$.

The monomer ($n^2$) may be any one as long as being copolymerizable with the monomer ($m^3$) and the monomer ($m^4$), but a monomer providing a crosslinking site is preferable. Examples thereof include VdF.

Among these, the polyol-crosslinkable fluoroelastomer is preferably a fluoroelastomer composed of VdF and at least one other fluorine-containing monomer, and is preferably at least one elastomer selected particularly from the group consisting of VdF/HFP-based fluoroelastomer, VdF/TFE/HFP-based fluoroelastomer and VdF/TFE/PAVE-based fluoroelastomer, and more preferably at least one elastomer selected from the group consisting of VdF/HFP-based fluoroelastomer and VdF/TFE/HFP-based fluoroelastomer.

In the fluoroelastomer, the Mooney viscosity (ML 1+10 (100° C.)) at 100° C. is preferably 2 or higher, more preferably 10 or higher, still more preferably 20 or higher and especially preferably 30 or higher, and is preferably 200 or lower, more preferably 150 or lower, still more preferably 120 or lower and especially preferably 100 or lower. The Mooney viscosity is a value measured according to ASTM-D1646 and JIS K6300.

In the fluoroelastomer, the fluorine concentration is preferably 50 to 75% by mass, more preferably 60 to 73% by mass and still more preferably 63 to 72% by mass. The fluorine concentration is determined by calculation from the composition ratio of monomer units constituting the fluoroelastomer.

The fluoroelastomer described above can be produced by a usual method.

(b) Cross-Linking Agent for Polyol Crosslinking

The fluoroelastomer composition of the present disclosure further comprises a cross-linking agent for polyol crosslinking. As the cross-linking agent for polyol crosslinking to be used in the present disclosure, there can be used a compound conventionally known as a cross-linking agent of fluoroelastomer, and there can suitably be used, for example, a polyhydroxy compound, and from the viewpoint of being excellent in heat resistance, particularly a polyhydroxy aromatic compound.

When the fluoroelastomer is crosslinked by a polyol crosslinking system, the resultant has carbon-oxygen bonds on crosslinked points and is suitable in the characteristic points of being small in compression set, good in moldability and excellent in sealability and heat resistance.

The polyhydroxy aromatic compound is not limited, and examples thereof include 2,2-bis(4-hydroxyphenyl)propane (hereinafter, referred to as bisphenol A), 2,2-bis(4-hydroxyphenyl)perfluoropropane (hereinafter, referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter, referred to as bisphenol B), 4,4-bis(4-hydroxyphenyl)valeric acid, 2,2-bis(4-hydroxyphenyl)tetrafluorodichloropropane, 4,4'-dihydroxydiphenyl sulfone, 4,4'-dihydroxydiphenyl ketone, tri(4-hydroxyphenyl)methane, 3,3',5,5'-tetrachlorobisphenol A, and 3,3',5,5'-tetrabromobisphenol A.

Among these, bisphenol AF is preferable because of being excellent in the heat resistance of molded articles to be obtained.

In the fluoroelastomer composition, the content of the cross-linking agent for polyol crosslinking is, since there can be provided molded articles with higher resistance to organic acids and resistance to carboxylate ester compounds, with respect to 100 parts by mass of the polyol-crosslinkable fluoroelastomer, preferably 0.5 to 15 parts by mass, more preferably 0.5 to 5 parts by mass and still more preferably 0.5 to 3 parts by mass.

(c) Crosslinking Accelerator

The fluoroelastomer composition of the present disclosure further comprises a crosslinking accelerator. Use of the crosslinking accelerator enables the crosslinking reaction to be promoted by promoting the formation of intramolecular double bonds in dehydrofluorination reaction of the main chain of the fluoroelastomer.

As the crosslinking accelerator for the polyol crosslinking system, an onium compound is generally used. The onium compound is not limited, and examples thereof include ammonium compounds such as quaternary ammonium salts, phosphonium compounds such as quaternary phosphonium salts, oxonium compounds, sulfonium compounds, cyclic amines and monofunctional amine compounds; among these, quaternary ammonium salts and quaternary phosphonium salts are preferable.

Examples of the quaternary ammonium salts are not limited, but include 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methylsulfate, 8-ethyl-1,8-diazabicyclo[5.4.0]-7-undecenium bromide, 8-propyl-1,8-diazabicyclo[5.4.0]-7-undecenium bromide, 8-dodecl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (hereinafter, referred to as DBU-B), 8-benzyl-1,8-diazabicyclo[5.4.0]-7-undecenium hydroxide, 8-phenethyl-1,8-diazabicyclo[5.4.0]-7-undecenium chloride, and 8-(3-phenylpropyl)-1,8-diazabicyclo[5.4.0]-7-undecenium chloride. Among these, from the viewpoint of crosslinkability, and properties of crosslinked products, DBU-B is preferable.

Examples of the quaternary phosphonium salts are not limited, but can include tetrabutylphosphonium chloride, benzyltriphenylphosphonium chloride (hereinafter, referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride; among these, from the viewpoint of crosslinkability, and properties of crosslinked products, benzyltriphenylphosphonium chloride (BTPPC) is preferable.

Further as the crosslinking accelerator, there can also be used quaternary ammonium salts and chlorine-free cross-linking accelerators disclosed in Japanese Patent Laid-Open No. 11-147891. The crosslinking accelerator further also includes, as combinations of the cross-linking agent for polyol crosslinking and the crosslinking accelerator, solid solutions of a quaternary phosphonium salt and bisphenol AF, and a benzyltriphenylphosphonium salt of bisphenol AF.

In the fluoroelastomer composition, the content of the crosslinking accelerator is, since there can be provided molded articles with higher resistance to organic acids and resistance to carboxylate ester compounds, with respect to 100 parts by mass of the polyol-crosslinkable fluoroelastomer, preferably 0.05 to 5 parts by mass, more preferably 0.05 to 3 parts by mass and still more preferably 0.05 to 2 parts by mass.

(d) Acid Acceptor

An acid acceptor (d) contained in the fluoroelastomer composition of the present disclosure is at least one selected from the group consisting of a basic magnesium carbonate and a magnesium phosphate. The present inventor has newly found that the use of these compounds as the acid acceptor for the polyol-crosslinkable fluoroelastomer, which compounds have not been used so far, enables molded articles excellent in resistance to organic acids and resistance to carboxylate ester compounds to be provided. The fluoroelastomer composition of the present disclosure has been completed on this finding.

The basic magnesium carbonate is usually represented by the following general formula (8).

$$mMgCO_3 \cdot Mg(OH)_2 \cdot nH_2O \tag{8}$$

wherein m is 3 to 5, and n is 3 to 8.

The magnesium phosphate includes magnesium dihydrogenphosphate, magnesium hydrogenphosphate, trimagnesium phosphate and magnesium pyrophosphate, and among these, trimagnesium phosphate is preferable. Then, the magnesium phosphate may be a magnesium phosphate hydrate, and examples thereof include trimagnesium phosphate trihydrate, trimagnesium phosphate pentahydrate, trimagnesium phosphate octahydrate, trimagnesium phosphate decahydrate, and trimagnesium phosphate docosahydrate. As the magnesium phosphate, trimagnesium phosphate octahydrate ($Mg_3(PO_4)_2 \cdot 8H_2O$) is especially preferable because of being capable of providing molded articles with higher resistance to organic acids and resistance to carboxylate ester compounds.

In the fluoroelastomer composition, the content of the acid acceptor is, since there can be provided molded articles with higher resistance to organic acids and resistance to carboxylate ester compounds, with respect to 100 parts by mass of the polyol-crosslinkable fluoroelastomer, preferably 2 to 40 parts by mass, more preferably 3 to 30 parts by mass and still more preferably 4 to 25 parts by mass.

In the fluoroelastomer composition, the content of the basic magnesium carbonate is, since there can be provided molded articles with higher resistance to organic acids and resistance to carboxylate ester compounds, with respect to 100 parts by mass of the polyol-crosslinkable fluoroelastomer, preferably 2 to 40 parts by mass, more preferably 2 to 15 parts by mass and still more preferably 4 to 10 parts by mass.

In the fluoroelastomer composition, the content of the magnesium phosphate is, since there can be provided molded articles with higher resistance to organic acids and resistance to carboxylate ester compounds, with respect to 100 parts by mass of the polyol-crosslinkable fluoroelastomer, preferably 2 to 40 parts by mass, more preferably 10 to 30 parts by mass and still more preferably 15 to 25 parts by mass.

(e) Other Ingredients

The fluoroelastomer composition of the present disclosure may further comprise a metal hydroxide. The metal hydroxide includes calcium hydroxide.

In the fluoroelastomer composition, the content of the metal hydroxide is, with respect to 100 parts by mass of the polyol-crosslinkable fluoroelastomer, preferably 0.5 to 30 parts by mass, more preferably 1 to 15 parts by mass and still more preferably 1 to 3 parts by mass. Although by using the metal hydroxide, the crosslinking speed is supplemented therewith in some cases, when the content of the metal hydroxide is too high, the use thereof poses such a risk that the resistance to organic acids and the resistance to carboxylate ester compounds are impaired.

The fluoroelastomer composition, as required, can include usual additives included in fluoroelastomer compositions, for example, fillers (carbon black, barium sulfate and the like), processing aids (wax and the like), plasticizers, colorants, stabilizers, tackifiers (cumarone resins, cumarone indene resins and the like), mold release agents, electroconductivity imparting agents, thermal conductivity imparting agents, surface non-adhesive agents, softness imparting agents, heat resistance improvers and flame retarders, and may include one or more of common cross-linking agents and/or crosslinking accelerators different from the above-mentioned ones.

The content of, for example, a filler such as carbon black is not limited, but is, with respect to 100 parts by mass of the polyol-crosslinkable fluoroelastomer, preferably 0 to 150 parts by mass, more preferably 1 to 100 parts by mass and still more preferably 2 to 50 parts by mass.

The content of a processing aid such as wax is preferably 0 to 10 parts by mass with respect to 100 parts by mass of the polyol-crosslinkable fluoroelastomer. Since use of a processing aid, a plasticizer and a mold release agent is likely to reduce the mechanical property and sealability of molded articles to be obtained, the contents of these need to be regulated according to an aiming hardness.

The fluoroelastomer composition of the present disclosure may or may not contain a divalent metal oxide, but even in the case of containing a divalent metal oxide, the content of the divalent metal oxide is lower than 1 part by mass with respect to 100 parts by mass of the polyol-crosslinkable fluoroelastomer. The content of the divalent metal oxide is preferably 0.5 part by mass or lower, more preferably 0.2 part by mass or lower, still more preferably 0.1 part by mass or lower and especially preferably 0.01 part by mass or lower; and it is also preferable that the fluoroelastomer contains substantially no divalent metal oxide. In the case where the crosslinking speed of the fluoroelastomer composition is insufficient, although there are some cases where use of the divalent metal oxide can improve the crosslinking speed, in order to provide sufficient resistance to organic acids and resistance to carboxylate ester compounds, it is preferable to as much as possible avoid using the divalent metal oxide.

The divalent metal oxide includes oxides of magnesium, calcium, lead, zinc and the like.

For the same reason, the fluoroelastomer composition may or may not contain a hydrotalcite, but even in the case of containing the hydrotalcite, it is preferable that the amount thereof is made small. The content of the hydrotalcite is, with respect to 100 parts by mass of the polyol-crosslinkable fluoroelastomer, preferably lower than 2 parts by mass, more preferably 1 part by mass or lower, still more preferably 0.5 part by mass or lower and especially preferably 0.1 part by mass or lower; and it is also preferable that the fluoroelastomer composition contains substantially no hydrotalcite.

For the same reason, the fluoroelastomer composition may or may not contain an alkaline metal silicate salt, but even in the case of containing the alkaline metal silicate salt, it is preferable that the amount thereof is made small. The content of the alkaline metal silicate salt is, with respect to 100 parts by mass of the polyol-crosslinkable fluoroelastomer, preferably lower than 5 parts by mass, more preferably 1 part by mass or lower, still more preferably 0.5 part by mass or lower, especially preferably 0.1 part by mass or lower and most preferably 0.01 part by mass or lower; and it is also preferable that the fluoroelastomer composition contains substantially no alkaline metal silicate salt.

The fluoroelastomer composition is obtained by kneading the fluoroelastomer (a), the cross-linking agent for polyol crosslinking (b), the crosslinking accelerator (c), the acid acceptor (d) and the other ingredients such as the filler by using a rubber kneading machine generally used. As the rubber kneading machine, there can be used a roll, a kneader, a Banbury mixer, an internal mixer, a twin-screw extruder or the like.

In order to homogeneously disperse the ingredients in the elastomer, there may be used a method in which the fluoroelastomer (a), the cross-linking agent for polyol crosslinking (b) and the crosslinking accelerator (c) are melted and kneaded at a high temperature of 100 to 200° C. in a closed-type kneading machine such as a kneader, and thereafter kneading the acid acceptor (d) and the other ingredients such as the filler at a relatively low temperature equal to or lower than the temperature. There is also a method of carrying out homogeneous dispersing by using a solid solution in which the cross-linking agent for polyol crosslinking (b) and the crosslinking accelerator (c) are once caused to melt to cause melting point lowering.

The dispersibility can further be enhanced by kneading the fluoroelastomer (a), the cross-linking agent for polyol crosslinking (b), the crosslinking accelerator (c), the acid acceptor (d) and the other ingredients such as the filler, and after the resultant is left at room temperature for 12 hours or longer, further by again kneading the resultant.

<Molded Article>

By crosslinking the fluoroelastomer composition, a molded article of the present disclosure can be obtained. Also by molding and crosslinking the fluoroelastomer composition, a molded article of the present disclosure can be obtained. The fluoroelastomer composition can be molded by a conventionally known method. Methods and conditions of the molding and the crosslinking may be those in the ranges of known methods and conditions of molding and crosslinking to be adopted. The order of the molding and the crosslinking is not limited; the crosslinking may be carried out after the molding, or the molding is carried out after the crosslinking, or the molding and the crosslinking may be carried out simultaneously.

Examples of the molding method include a compression molding method, casting method, injection molding method and extrusion method using a metal mold, but is not limited thereto. As a crosslinking method, there can be adopted a steam crosslinking method, a usual method in which a crosslinking reaction is initiated by heating, a radiation crosslinking method, or the like; among these, the crosslinking reaction is carried out preferably by the steam crosslinking method or by heating. The unlimited specific crosslinking condition may suitably be determined according to the kinds of the cross-linking agent for polyol crosslinking (b), the crosslinking accelerator (c), the acid acceptor (d) and the like to be used usually in the temperature range of 140 to 250° C. and in the crosslinking time of 1 min to 24 hours.

The molded article of the present disclosure can also be used to laminate it with another molded article different from the molded article of the present disclosure. For example, a laminate having a layer of the molded article of the present disclosure and a layer of another molded article is also one of preferred embodiments. The laminate may be one having a single layer of another molded article, or one having two or more layers of other molded articles where the order of the layers is not limited.

Other materials constituting the other molded articles may be selected suitably according to required properties, expected applications and the like. The other materials include other elastomers, thermoplastic resins and the like described later.

As the other elastomers, in the case of particularly requiring the chemical resistance and the softness, preferable is an elastomer composed of at least one selected from the group consisting of acrylonitrile-butadiene elastomers or hydrogenated elastomers thereof, blend elastomers of acrylonitrile-butadiene elastomers and polyvinyl chloride, fluoroelastomers, epichlorohydrin elastomers, EPDM, ethylene acrylic elastomers, acrylic elastomers, silicone elastomers and fluorosilicone elastomers; and more preferable is an elastomer composed of at least one selected from the group consisting of acrylonitrile-butadiene elastomers or hydrogenated elastomers thereof, epichlorohydrin elastomers, ethylene acrylic elastomers, acrylic elastomers and silicone elastomers.

As the thermoplastic resin, preferable is a thermoplastic resin of at least one selected from the group consisting of fluororesins, polyamide resins, polyolefin resins, polyester resins, polyvinyl alcohol resins, polyvinyl chloride resins and polyphenylene sulfide resins; and more preferable is a thermoplastic resin of at least one selected from the group consisting of fluororesins, polyamide resins, polyvinyl alcohol resins and polyphenylene sulfide resins.

The laminate may be one having a layer of the molded article of the present disclosure and a layer of another molded article which are directly laminated, and may also be one having the two layers and an adhesive layer interposed therebetween. By interposing the adhesive layer, the layer of the molded article of the present disclosure and the layer of another molded article can be firmly joined and unified.

A method for producing the laminate is not limited, and also the timings of the molding and the crosslinking are not limited.

The method for producing the laminate includes, in the case where another material constituting another molded article is another elastomer, for example, a production method in which the fluoroelastomer composition of the present disclosure and another elastomer are laminated and both the layers are then simultaneously crosslinked, a production method in which either one of the fluoroelastomer composition of the present disclosure and another elastomer is molded and crosslinked to fabricate one crosslinked molded article, and thereafter laminated with the other uncrosslinked molded article, which is then further crosslinked, and a production method in which the fluoroelastomer composition of the present disclosure and another elastomer are each molded and crosslinked to separately fabricate crosslinked molded articles, both of which are then laminated.

The method for producing the laminate includes, in the case where another material constituting another molded article is a thermoplastic resin, for example, a production method in which the fluoroelastomer composition of the present disclosure and the thermoplastic resin are laminated and the fluoroelastomer composition is then crosslinked, and a production method in which the fluoroelastomer composition of the present disclosure is molded and crosslinked to fabricate one crosslinked molded article, and thereafter laminated with a molded article of the thermoplastic resin.

When the laminate is fabricated, the molded article of the present disclosure or another molded article, as required, may be subjected to a surface treatment. The surface treatment is not limited in method as long as being a treatment method which enables adhesion, and examples thereof include discharge treatments such as plasma discharge treatment and corona discharge treatment, and wet methods such as metal sodium/naphthalene solution treatment. Further a primer treatment is also suitable as the surface treatment. The primer treatment can be carried out according to a common method. In the case of carrying out the primer treatment, the primer treatment may be carried out on the surface of a fluoroelastomer having been subjected to no surface treatment, but it is more effective that the plasma discharge treatment, the corona discharge treatment, the metal sodium/naphthalene solution treatment, or the like is beforehand carried out, and then, the primer treatment is further carried out.

The hardness of the molded article of the present disclosure is usually 50 or higher, and from the viewpoint that the mechanical property of the molded article is good, preferably 65 or higher, more preferably 67 or higher and still more preferably 70 or higher; and the upper limit thereof is not limited, but in consideration of the softness, may be 100 or lower. The hardness described here is a hardness (value after 3 sec) measured by a type-A durometer according to JIS K6253-3. In the case where the hardness (value after 3 sec) measured by a type-A durometer exceeds 90, the hardness is a hardness (value after 3 sec) measured by a type-D durometer.

Since the fluoroelastomer composition can provide molded articles excellent in the resistance to organic acids and the resistance to carboxylate ester compounds, the fluoroelastomer composition can suitably be used as a fluoroelastomer composition for hoses or a fluoroelastomer composition for sealing materials; and since the fluoroelastomer composition can provide molded articles having a hardness in the above range, the fluoroelastomer composition can especially suitably be used as a fluoroelastomer composition for hoses.

Since the molded article of the present disclosure is excellent in the resistance to organic acids and the resistance to carboxylate ester compounds, the molded article is preferably a hose or a sealing material, and more preferably a hose. The molded article can suitably be utilized particularly as a hose or a sealing material contacting with a fluid containing one of or both of an organic acid and a carboxylate ester compound.

The organic acid includes formic acid, acetic acid, propionic acid, oxalic acid and citric acid.

The carboxylate ester compound may be a carboxylate ester compound to be contained in a biodiesel fuel. Examples of the carboxylate ester compound include rapeseed oil methyl ester, soybean oil methyl ester, sunflower oil methyl ester, coconut oil methyl ester and palm oil methyl ester.

Since the molded article of the present disclosure is excellent in the resistance to organic acids and the resistance to carboxylate ester compounds, the molded article can suitably be utilized as a member for a biodiesel fuel or a member for an air management system of an internal-combustion engine.

Examples of the member for a biodiesel fuel include hoses for biodiesel fuels. The biodiesel fuels are fuels obtained by esterifying higher fatty acids obtained by expressing organism (biomass) oils, mainly plant oils, and are mixtures containing light oils, higher fatty acid esters and/or higher fatty acids. There are cases where a biodiesel fuel made by esterifying a higher fatty acid is used as a single product, cases where a biodiesel fuel is used by being mixed, for example, with a light oil in light oil:biodiesel fuel=90:10 (in % by volume), and other cases.

The member for an air management system is a member to be used for an air management system. The air management system is one in the interior of which gas is circulated, and examples thereof include structures accessary to usual engines (of automobiles, marine vessels, construction machines and the like), such as air filters, turbochargers, inter-coolers, intake manifolds and exhaust gas recirculation coolers.

The member for an air management system is a member constituting the air management system, and also includes members connected directly to the air management system. Examples thereof include air ducts, turbocharger hoses, EGR (exhaust gas recirculation) hoses, hoses and seals of inter-coolers, intake manifold seals, hoses and seals of oxygen sensors, and hoses and seals of other sensors.

The gas circulated in the interior of the air management system is preferably at least one selected from the group consisting of $NO_x$, $SO_x$, and organic acids contained in combustion gases of gasolines, and especially preferably the organic acids contained in combustion gases of gasolines. The organic acids contained in combustion gases of gasolines include formic acid and acetic acid. In the case where the circulated gas is the above gases, the member, which is excellent in resistance to organic acids, for an air management system of the present disclosure is especially useful.

Therefore, the member for an air management system is preferably a member for an air management system in which the above gas is circulated, and more preferably at least one selected from the group consisting of, for example, turbocharger hoses and EGR hoses. The member is, from the viewpoint of the heat resistance, especially useful as the EGR (exhaust gas recirculation) hose.

The member for an air management system of the present disclosure is preferably the turbocharger hose. A turbo system is a system in which exhaust gas from an engine is fed to a turbine to rotate the turbine, and the rotation moves a compressor connected to the turbine to raise the compression ratio of air to be fed to the engine to thereby improve the output. The turbo system utilizing exhaust gas of engines and providing a high output leads also to the downsizing of engines, the fuel consumption reduction of automobiles and the cleaning of exhaust gas.

The turbocharger hose is used as a hose for feeding compressed air to an engine in a turbo system. In order to make effective use of the small space of an engine room, an elastomer hose excellent in flexibility and softness is advantageous, and typically, a hose is adopted which has a multilayer structure having, as an inner layer, an elastomer (particularly fluoroelastomer) excellent in heat aging resistance and oil resistance and, as an outer layer, a silicone elastomer or an acrylic elastomer. However, since the gas circulated in the interior of the turbo system is a condensable acidic gas, excellent resistance to organic acids is required.

The member for an air management system of the present disclosure is especially useful as the turbocharger hose since it has the heat aging resistance and oil resistance of the fluoroelastomer and additionally has the excellent resistance to organic acids.

The member for an air management system of the present disclosure is preferably also an EGR (exhaust gas recirculation) hose. The EGR (exhaust gas recirculation) hose is used as a hose to be used for exhaust gas recirculation coolers. As the hose to be used for exhaust gas recirculation coolers, an elastomer hose excellent in flexibility and softness is advantageous, and a fluoroelastomer excellent also in heat aging resistance is suitable. However, since the gas circulated in the interior of the exhaust gas recirculation coolers is a condensable acidic gas, excellent resistance to organic acids is required for the EGR hose.

The member for an air management system of the present disclosure is, since having the heat aging resistance, which fluoroelastomers have, and additionally also having the excellent resistance to organic acids, especially useful as the EGR hose.

The molded article of the present disclosure can suitably be used as the member for a biodiesel fuel or the member for an air management system of an internal-combustion engine, but can also be used in other applications.

The molded article can suitably be used, for example, in the semiconductor-related fields such as semiconductor manufacturing apparatuses, liquid crystal panel manufacturing apparatuses, plasma panel manufacturing apparatuses, plasma address liquid crystal panels, field emission display panels and solar cell substrates; the automotive fields; the air craft fields, the rocket fields; the marine vessel fields; the chemical product fields such as plants; the chemicals field such as medicines; the photographic fields such as developing machines; the printing fields such as printing machines; the coating fields such as coating equipment; the analyzer and physical and chemical appliance fields; the food plant equipment fields; nuclear plant equipment fields; the steel fields such as sheet iron work equipment; the general industrial fields; the electric fields; the fuel cell fields; and the like; among these, the molded article can more suitably be used in the automotive fields, the air craft fields, the rocket fields and the marine vessel fields. The molded article is useful, besides, as various types of compositions for coating materials, coated articles and the like.

In the automotive fields, gaskets, shaft seals, valve stem seals, sealing materials and hoses can be used for engines and peripheral devices thereof; hoses and sealing materials can be used for AT devices; and O (square) rings, tubes, packings, valve stem materials, hoses, sealing materials and diaphragm can be used for fuel systems and peripheral devices thereof.

Specifically, the molded article can be used as engine head gaskets, metal gaskets, oil pan gaskets, crank shaft seals, camshaft seals, valve stem seals, manifold packings, oil hoses, seals for oxygen sensors, ATF hoses, injector O rings, injector packings, fuel pump O rings, diaphragms, fuel hoses, crankshaft seals, gear box seals, power piston packings, seals of cylinder liners, seals of valve stems, front pump seals of automatic transmissions, rear axle pinion seals, gaskets of universal joints, pinion seals of speedometers, piston cups of foot brakes, O rings of torque transmission devices, oil seals, seals of exhaust gas afterburners, bearing seals, EGR tubes, twin carburetor tubes, diaphragms for sensors of carburetors, vibration isolating rubbers (engine mounts, exhaust sections and the like), hoses for afterburners, oxygen sensor bushes, and the like.

In the air craft fields, the rocket fields and the marine vessel fields, applications thereof include diaphragms, O (square) rings, valves, tubes, packings, hoses, sealing materials and the like, and these can be used in fuel systems.

Hitherto, embodiments have been described, but it should be understood that various changes and modifications in forms and details may be made without departing from the gist and scope of the claims.

EXAMPLES

Then, embodiments of the present disclosure will be described by way of Examples, but the present disclosure is not any more limited to these Examples alone.

Each numerical value in Examples was measured by the following method.

<Crosslinking Property (Optimum Crosslinking Time (T90))>

For a fluoroelastomer composition, in primary crosslinking, a crosslinking curve at a temperature described in Table 1 was determined by using a vulcanization tester (manufactured by M&K Co., Ltd. MDR H2030), and the optimum crosslinking time (T90) was determined from the change in the torque.

<Tensile Strength and Elongation at Break>

For a crosslinked sheet of 2 mm in thickness obtained in Examples and Comparative Examples, the tensile strength and the elongation at break at 23° C. were measured by a tensile tester (manufactured by A&D Co., Ltd., Tensilon RTG-1310) according to JIS K6251-1:2015 under the condition of 500 mm/min by using a dumbbell No. 5 test specimen.

<Hardness>

For a sheet prepared by stacking three sheets of a crosslinked sheet of 2 mm in thickness obtained in Examples and Comparative Examples, the hardness (a peak value and a value after 3 sec) was measured by a type-A durometer according to JIS K6253-3:2012.

<Density>

For a crosslinked sheet of 2 mm in thickness obtained in Examples and Comparative Examples, the density was determined according to JIS K6268.

<SME Resistance>

A test specimen was subjected to an immersion test at 120° C. for 504 hours in a biodiesel fuel (an SME (soybean oil methyl ester) fuel (manufactured by Peter Cremer GmbH & Co. KG, NEXSOL BD-0100 BIODIESEL), containing 2% by volume of moisture). The volume and the mass of the test specimen before and after the immersion test were measured, and the volumetric swelling ratio ($\Delta V$) and the mass change ratio ($\Delta W$) were determined. The volumetric swelling ratio ($\Delta V$) is a change ratio (representing the degree of swelling) of the volume after the test specimen is immersed under a predetermined condition, and is represented by $\Delta V=(V-V_o)/V_o \times 100$ where $V_o$ represents an original volume of the test specimen and V represents a volume thereof after the test. The mass change ratio ($\Delta W$) is represented by $\Delta W=(W-W_o)/W_o \times 100$ where $W_o$ represents an original mass of the test specimen and W represents a volume thereof after the test. ps <Resistance to Organic Acids>

A test specimen was subjected to an immersion test at 60° C. for 168 hours in an aqueous solution (acetic acid/formic acid/water=0.2/0.8/99 (in mass ratio)) of acetic acid and formic acid. The volume and the mass of the test specimen before and after the immersion test were measured, and the volumetric swelling ratio ($\Delta V$) and the mass change ratio ($\Delta W$) were determined.

In Examples and Comparative Examples, the following materials were used.

Precompound 1

A mixture of 100 parts by mass of a fluoroelastomer (VdF/HFP=78/22 (in molar ratio)), 0.6 part by mass of bisphenol AF, and 1.65 parts by mass of a mixture (a chlorine-free crosslinking accelerator fabricated from bisphenol AF:benzyltriphenylphosphonium chloride=4:1 (in molar ratio)) of a benzyltriphenylphosphonium salt of bisphenol AF with bisphenol AF Precompound 2

A mixture of 100 parts by mass of a fluoroelastomer (VdF/HFP=78/22 (in molar ratio)), 2 parts by mass of bisphenol AF and 0.43 part by mass of benzyltriphenylphosphonium chloride Precompound 3

A mixture of 100 parts by mass of a fluoroelastomer (VdF/HFP=78/22 (in molar ratio)), 1.5 parts by mass of bisphenol AF and 0.3 part by mass of 8-benzyl-1,8-diazabicyclo[5.4.0]-7-undecenium chloride MT carbon (N₂SA: 8 m²/g, DBP: 43 ml/100 g) Soft basic magnesium carbonate: manufactured by FUJIFILM Wako Pure Chemical Corp.
Trimagnesium phosphate octahydrate: manufactured by FUJIFILM Wako Pure Chemical Corp.
Calcium hydroxide: trade name "NICO 5000", manufactured by Inoue Calcium Corp.
Magnesium oxide: trade name "Kyowamag 150", manufactured by Kyowa Chemical Industry Co., Ltd.
Hydrotalcite: trade name "DHT-4A", manufactured by Kyowa Chemical Industry Co., Ltd.
Magnesium silicate: trade name "High tronA", manufactured by Takehara Chemical Industrial Co., Ltd.

Examples 1 to 7, Comparative Examples 1 to 4

Respective ingredients were compounded according to the formulation in Table 1, and kneaded on an open roll to thereby prepare fluoroelastomer compositions. The cross-linking property (T90) of the resultant fluoroelastomer compositions is shown in Table 1. The resultant fluoroelastomer compositions were pressed under the molding conditions described in Table 1 to be crosslinked, and thereafter oven crosslinked to thereby fabricate crosslinked sheets (thickness: 2 mm). The evaluation results of the resultant crosslinked sheets are shown in Table 1.

Note that the fluoroelastomer composition prepared in Comparative Example 4 could not be crosslinked.

TABLE 1

|  |  | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| Compounding ||||||||||||
| Precompound 1 | parts by mass | 100 |  |  | 100 | 100 | 100 | 100 | 100 | 100 | 100 | 100 |
| Precompound 2 | parts by mass |  | 100 |  |  |  |  |  |  |  |  |  |
| Precompound 3 | parts by mass |  |  | 100 |  |  |  |  |  |  |  |  |
| MT carbon | parts by mass | 20 | 20 | 20 | 50 | 20 | 20 | 20 | 20 | 20 | 20 | 20 |
| Soft basic magnesium carbonate | parts by mass | 7 | 7 | 7 | 7 | 4 |  | 4 |  |  |  |  |
| Trimagnesium phosphate octahydrate | parts by mass |  |  |  |  |  | 20 |  |  |  |  |  |
| Calcium hydroxide | parts by mass |  |  |  |  | 3 |  |  | 6 |  |  |  |
| Magnesium oxide | parts by mass |  |  |  |  |  |  |  | 3 | 7 |  |  |
| Hydrotalcite | parts by mass |  |  |  |  |  |  | 3 |  |  | 7 |  |
| Magnesium silicate | parts by mass |  |  |  |  |  |  |  |  |  |  | 7 |
| Crosslinking property ||||||||||||
| 150° C. T90 | min | 39.3 | — | — | — | 28.6 | — | 33.4 | 18.3 | 21.7 | 46.1 | not crosslinked |
| 170° C. T90 | min | 6.7 | 32.4 | 42.6 | 8.2 | 5.2 | 17.6 | 6.2 | 4.0 | 5.2 | 8.2 | not crosslinked |
| 180° C. T90 | min | — | 13.7 | 18.3 | — | — | — | — | — | — | — | not crosslinked |
| Molding condition ||||||||||||
| Press crosslinking | ° C. | 150 | 160 | 160 | 170 | 150 | 170 | 150 | 170 | 170 | 150 | — |
|  | min | 45 | 120 | 120 | 20 | 45 | 30 | 45 | 15 | 15 | 90 | — |
| Oven crosslinking | ° C. | 230 | 230 | 230 | 230 | 230 | 230 | 230 | 230 | 230 | 230 | — |
|  | hrs | 24 | 24 | 24 | 24 | 24 | 24 | 24 | 24 | 24 | 24 | — |
| Properties in the normal condition ||||||||||||
| Tensile strength | MPa | 16.1 | 13.9 | 13.8 | 19.1 | 16.1 | 13.2 | 18.3 | 15.7 | 20.1 | 17.6 | — |
| Elongation at break | % | 210 | 190 | 190 | 180 | 220 | 250 | 240 | 250 | 260 | 250 | — |
| Hardness Peak | — | — | 71 | 73 | 71 | 88 | 70 | 76 | 73 | 70 | 67 | 73 | — |
| Hardness 3 sec | — | 67 | 70 | 67 | 85 | 66 | 72 | 69 | 66 | 63 | 70 | — |
| Density | Mg/m³ | 1.82 | 1.82 | 1.83 | 1.83 | 1.83 | 1.83 | 1.83 | 1.85 | 1.84 | 1.83 | — |
| SME resistance ||||||||||||
| ΔV | % | 9 | 10 | 10 | 10 | 12 | 10 | 10 | 69 | 64 | 10 | — |
| ΔW | % | 4 | 5 | 5 | 5 | 7 | 5 | 5 | 36 | 33 | 5 | — |
| Resistance to organic acids ||||||||||||
| ΔV | % | 7 | 9 | 9 | 5 | 10 | 5 | 15 | 32 | 46 | 20 | — |
| ΔW | % | 4 | 5 | 6 | 3 | 6 | 4 | 9 | 18 | 26 | 12 | — |

The invention claimed is:

1. A fluoroelastomer composition, comprising:
   (a) a polyol-crosslinkable fluoroelastomer;
   (b) a cross-linking agent for polyol crosslinking;
   (c) a crosslinking accelerator; and
   (d) at least one acid acceptor selected from the group consisting of a basic magnesium carbonate and a magnesium phosphate,
   wherein a content of a divalent metal oxide is less than 1 part by mass with respect to 100 parts by mass of the fluoroelastomer (a) and a content of the acid acceptor (d) is 2 to 40 parts by mass with respect to 100 parts by mass of the fluoroelastomer (a).

2. The fluoroelastomer composition according to claim 1, wherein the fluoroelastomer composition comprises 0.5 to 15 parts by mass of the cross-linking agent for polyol crosslinking (b) with respect to 100 parts by mass of the fluoroelastomer (a).

3. The fluoroelastomer composition according to claim 1, wherein the fluoroelastomer composition comprises 0.05 to 5 parts by mass of the crosslinking accelerator (c) with respect to 100 parts by mass of the fluoroelastomer (a).

4. The fluoroelastomer composition according to claim 1, wherein the fluoroelastomer (a) comprises a vinylidene fluoride unit.

5. The fluoroelastomer composition according to claim 1, wherein the magnesium phosphate is trimagnesium phosphate octahydrate.

6. The fluoroelastomer composition according to claim 1, wherein a molded article obtained by crosslinking the fluoroelastomer composition has a hardness (a value after 3 sec) of 65 or higher as measured by a type-A durometer according to JIS K6253-3.

7. The fluoroelastomer composition according to claim 1, wherein the fluoroelastomer composition is used for a hose.

8. A molded article obtained by crosslinking the fluoroelastomer composition according to claim 1.

9. The molded article according to claim 8, wherein the molded article is a hose contacting with a fluid comprising one or both of an organic acid and a carboxylate ester compound.

10. The molded article according to claim 8, wherein the molded article is a member for a biodiesel fuel or a member for an air management system of an internal-combustion engine.

* * * * *